United States Patent
Hansen

(10) Patent No.: US 11,582,975 B2
(45) Date of Patent: Feb. 21, 2023

(54) FOOD PROCESSING SYSTEM AND A FOOD PROCESSING METHOD

(71) Applicant: CABINPLANT INTERNATIONAL A/S, Haarby (DK)

(72) Inventor: Henning Ingemann Hansen, Odense (DK)

(73) Assignee: CABINPLANT INTERNATIONAL A/S, Haarby (DK)

( * ) Notice: Subject to any disclaimer, the term of this patent is extended or adjusted under 35 U.S.C. 154(b) by 626 days.

(21) Appl. No.: 16/692,032

(22) Filed: Nov. 22, 2019

(65) Prior Publication Data
US 2020/0138045 A1 May 7, 2020

Related U.S. Application Data

(63) Continuation of application No. PCT/EP2018/063519, filed on May 23, 2018.

(30) Foreign Application Priority Data

May 23, 2017 (EP) .................................... 17172481

(51) Int. Cl.
*A21C 9/04* (2006.01)
*A21C 9/08* (2006.01)

(52) U.S. Cl.
CPC ................ *A21C 9/04* (2013.01); *A21C 9/085* (2013.01)

(58) Field of Classification Search
CPC .............. A21C 9/04; A21C 9/085; A21C 9/08
(Continued)

(56) References Cited

U.S. PATENT DOCUMENTS

| 4,152,976 A | 5/1979 | Kawasaki et al. |
| 4,907,720 A * | 3/1990 | Henson ............... A21C 9/04 |
| | | 118/308 |

(Continued)

FOREIGN PATENT DOCUMENTS

| EP | 1145635 | 10/2001 |
| EP | 1188379 | 3/2002 |

(Continued)

OTHER PUBLICATIONS

International Search Report on corresponding PCT application (PCT/EP2018/063519) from International Searching Authority (EPO) dated Jul. 20, 2018.

(Continued)

*Primary Examiner* — Laura Edwards
(74) *Attorney, Agent, or Firm* — KOS IP Law LLP

(57) ABSTRACT

A method and a food processing system for distributing within a specific time interval a batch of a specific weight of food products onto the top surface of a dough base, such as a pizza base, cake base or the like the food processing system comprising a dosing mechanism, a weighing system, a conveyor system and a controller. The method comprises the steps of:
  i. defining a target time interval constituting 40-90 percent of the specific time interval,
  ii. determining the actual weight of the batch received within a receptacle of the weighing system when the target time interval has passed,
  iii. dependent on the actual weight,
    a. determining a first operational mode provided the actual weight being reached in respect of the target weight within the target time interval, then continuing operating the first conveyor controlled by the controller at the identical speed, or (Continued)

b. determining a second operational mode provided the actual weight exceeding the target weight within the target time interval, then operating the first conveyor controlled by the controller at a decreased speed, or c. determining a third operational mode provided the actual weight being below the target weight within the target time interval, then operating the first conveyor controlled by the controller at an increased speed.

13 Claims, 6 Drawing Sheets

(58) Field of Classification Search
USPC ............ 426/231; 118/13, 24; 99/355, 450.1, 99/486, 494
See application file for complete search history.

(56) References Cited

U.S. PATENT DOCUMENTS

| 5,243,899 A | 9/1993 | Moshier et al. |
| 2005/0178277 A1 | 8/2005 | Simonsen |
| 2008/0187637 A1 | 8/2008 | Spiegel |

FOREIGN PATENT DOCUMENTS

| EP | 1388286 | 2/2004 |
| EP | 1884161 | 9/2012 |
| WO | WO2013033586 | 3/2013 |

OTHER PUBLICATIONS

Written Opinion on corresponding PCT application (PCT/ EP2018/063519) from International Searching Authority (EPO) dated Jul. 20, 2018.

* cited by examiner

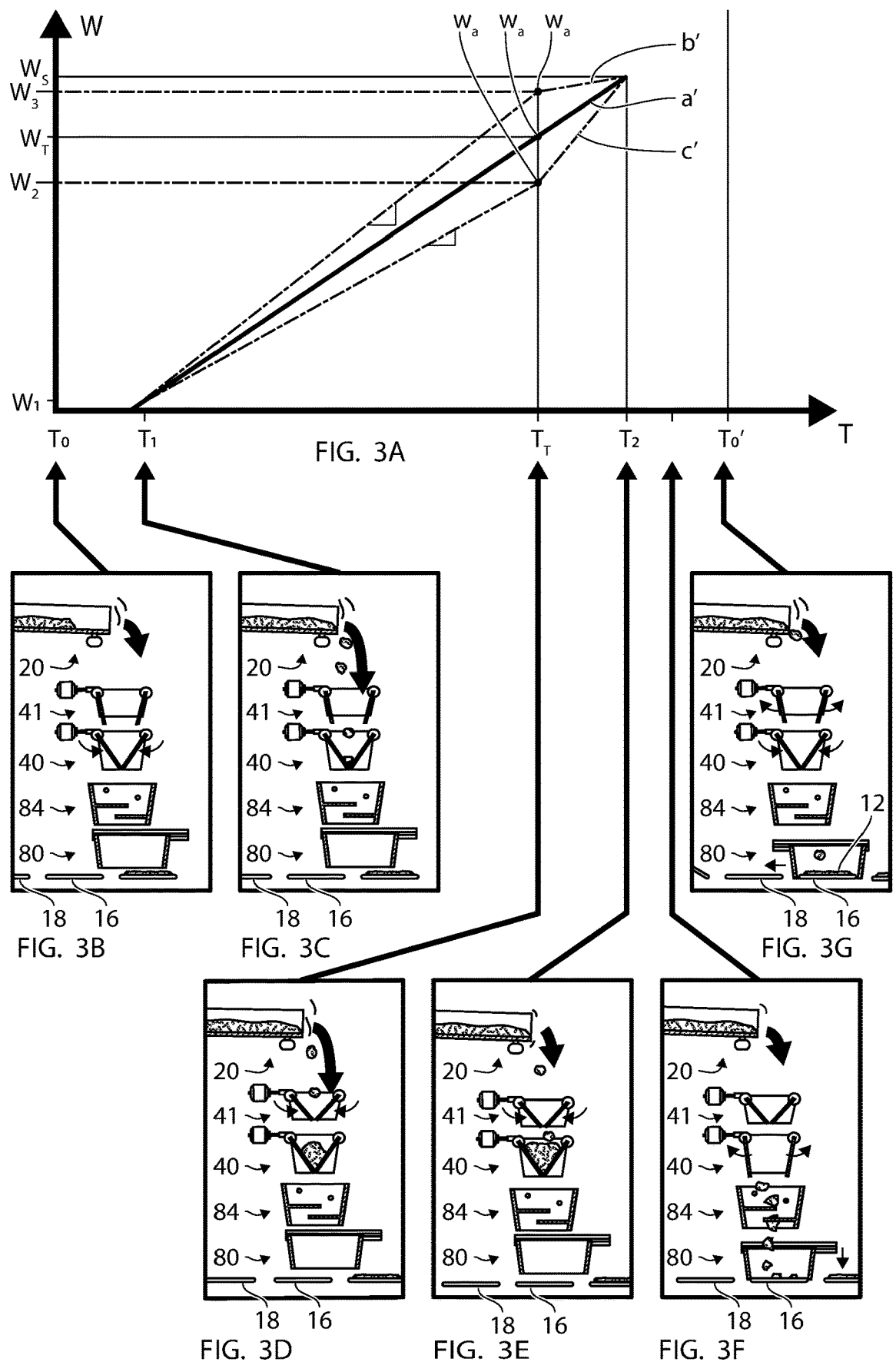

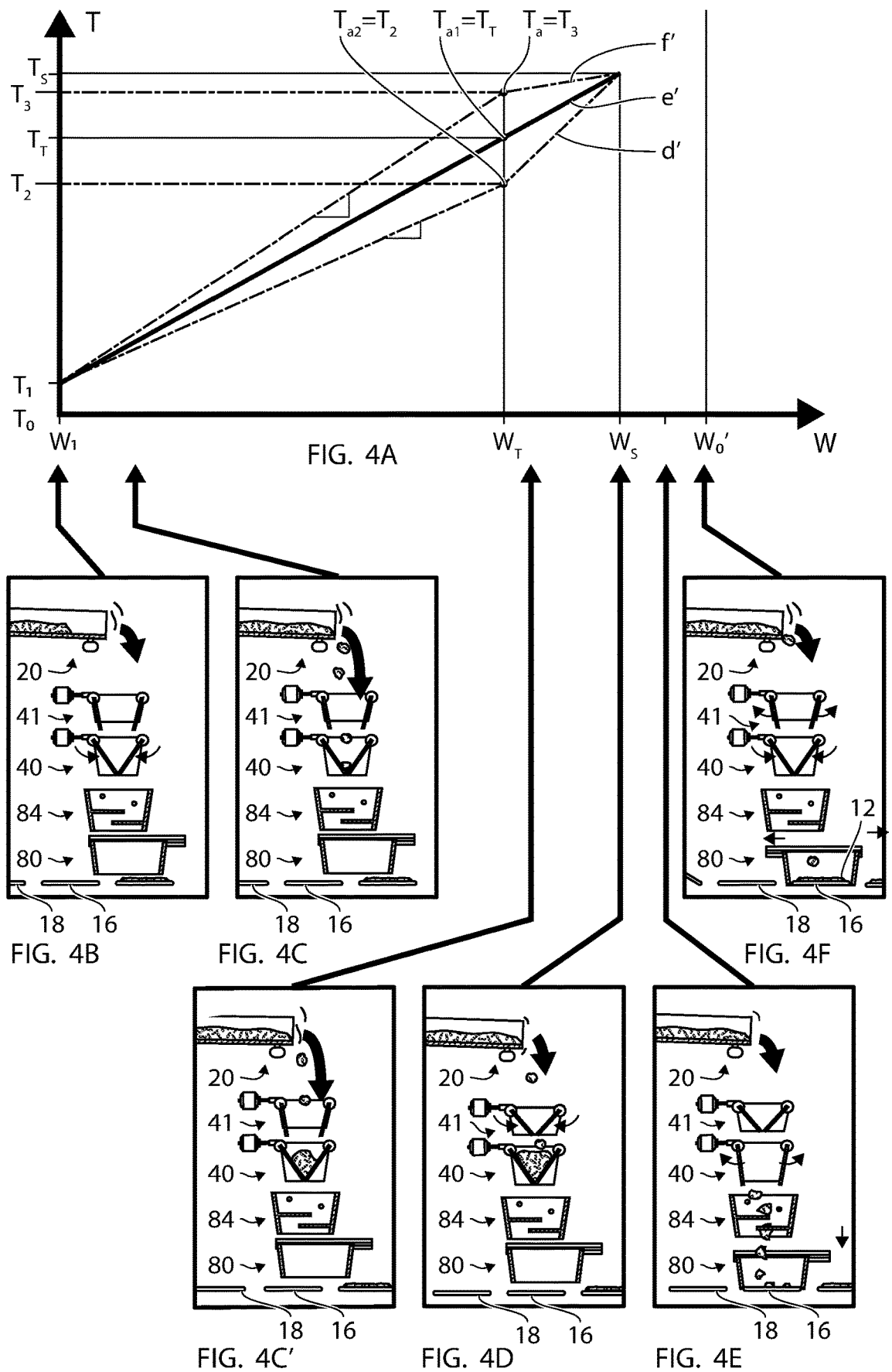

FOOD PROCESSING SYSTEM AND A FOOD PROCESSING METHOD

CROSS-REFERENCE TO RELATED APPLICATION

This application is a Continuation of International Application No. PCT/EP2018/063519, filed May 23, 2018, which claims priority from European Application No. EP 17172481.8, filed May 23, 2017. The disclosures of both prior applications are incorporated by reference herein in their entirety.

TECHNICAL FIELD

The present invention relates to a food processing system and method for distributing within a specific time interval a batch of food products or ingredients evenly on top of a dough base, such as a pizza base, cake base or the like.

BACKGROUND OF THE INVENTION

Automated manufacturing processes have been used for the last decade in the food manufacturing industries and several techniques for distribution of a batch or charge of a specific foodstuff or a mixture of different foodstuff have likewise been used, in particular in relation to the production of semi-finished food products like frozen pizza etc.

Automated manufacturing process requires that complicated tasks have to be handled during the production. In particular, there is a problem regarding an even distribution within a specific time interval of the ingredients onto the top surface of a dough base and ensuring that the right amount is distributed during the specific time interval.

The European patent EP 1 145 635 B1 discloses a method of applying and distributing a charge of a particulate edible material onto a top surface of a substrate made of an edible dough product including the steps of: providing a charge of particulate edible material from an overhead hopper; delivering the charge onto a movable vibrational surface having an area exceeding the area of the substrate, the surface being positioned above and in registration with the substrate; keeping the charge on the vibrational surface within a specific area corresponding to the area of the substrate by the use of an encircling guide defining the specific area and having a lower end with a flexible skirt for contacting and sealing against the vibrational surface; vibrating the vibrational surface for causing the charge received on the vibrational surface and kept within the specific area to be evenly and randomly distributed within the specific area; and transferring the charge from the vibrational surface onto the substrate by moving the vibrational surface away from the position above.

Other examples can be found in EP1884161B1, US2005/0178277A1 and US2008/0187637A1

One of the disadvantages of the known devices and the associated methods for distributing a batch of food products or ingredients evenly on top of a dough base is that they do not provide a reliable technique for depositing a batch within a defined target weight during a specific time interval. Consequently, resulting in a distribution of an inadequate quantity, where some of the dough bases having insufficient amount of topping and some of the dough bases having an excessive quantity.

An obvious problem associated with the actual weight of the batch being bigger than the intended specific weight on the dough base is the increased production cost, since the quantity of food products constitutes a significant portion of the total cost of the finished product, such as a pizza.

One challenge is to reduce deviation or variance in the weight of the batch being distributed or deposited on the dough bases. Another challenge is automated manufacturing, i.e. to ensure that each dough base is placed correctly on the conveyor belt so that the worker does not need to reposition the dough bases during production. Inaccurate placement of the dough bases is undesirable for various reasons, one reason would be that it is difficult to distribute the batch of food products correctly onto the top surface of the dough base, if the dough bases are placed substantially symmetrically or have an uneven size or shape. Still another challenge would be, that the batch of food products could be deposited so poorly that the vast amount would be on the conveyor belt, which would result in the finished product being discarded.

The general object of the present invention is to provide a simple and an efficient technique for distributing a batch of food products on top of the dough base within a defined specific time interval.

The present invention is primarily directed towards a food processing system comprising a dosing mechanism, a weighing system, a conveyor system, a controller and a method for controlling the food processing system.

In accordance with a method according to a first aspect of the invention, the invention discloses a method of distributing within a specific time interval a batch of a specific weight of food products onto the top surface of a dough base, such as a pizza base, cake base or the like by means of a food processing system comprising a dosing mechanism, a weighing system, a conveyor system and a controller, the method comprising the following steps:

providing the dosing mechanism having a first conveyor and a trough, the trough including a first inlet end, a first outlet end and a lower part, the first conveyor being positioned in the lower part of the trough providing the weighing system having a receptacle being positioned below the first outlet end of the trough, providing the conveyor system having a conveyor belt defining a conveying direction and a supporting surface for conveying a number of dough bases being substantially equally spaced on the supporting surface of the conveyor belt, providing a controller connected to the dosing mechanism, the weighing system and the conveyor system, the specific time interval being the time interval between the presence of a first dough base being positioned directly under the receptacle and the presence of a subsequent or second dough base being positioned directly under the receptacle, i. defining a target weight constituting 40-90 percent of the specific weight of the batch, ii. introducing the food products in bulk into the first inlet end of the trough, iii. conveying the food products from the first inlet end to the first outlet end of the trough for discharging the batch of the food products into the receptacle, iv. conveying the dough bases in the conveying direction for allowing the dough bases to pass individually under the receptacle, v. defining a target time interval constituting 40-90 percent of the specific time interval, vi. determining the actual weight of the batch received within the receptacle when the target time interval has passed, vii. dependent on the actual weight, a. determining a first operational mode provided the actual weight being reached in respect of the target weight within the target time interval, then continuing operating the first conveyor controlled by the controller at the identical speed, or b. determining a second operational mode provided the actual weight exceeding the target weight within the target time interval, then operating the first conveyor controlled by the controller at a decreased speed, or c. determining a third operational mode provided the actual weight being below the target weight within the target time interval, then operating the first conveyor controlled by the controller at an increased speed, viii. transferring the batch of the specific weight being collected in the receptacle on top of the dough bases within the specific time interval, and ix. repeating the step in points (ii, iii, iv, vi, vii, and viii).

According to the teaching in a first aspect of the invention, the distribution of the food products onto the top surface of the dough base is established by controlling the dosing mechanism based on determining the actual weight in the receptacle of the weighing system, when the target time interval has passed. As the controller is connected to the dosing mechanism, the weighing system and the conveyor system, it is possible to distribute a precise quantity of food products on the top surface of the dough base, hereby reducing the amount of spillage in the form of batch having a weight above the specific weight.

The controller provides a method for adjusting the speed of the first conveyor in order to ensure that the specific weight of the batch is reached within the specific time interval during the production of e.g. pizza, cake, base or the like. The specific time being defined by the speed of the conveyor system. By adjusting the speed of the first conveyor, it is possible to control the amount of food products being conveyed from the first inlet end to the first outlet end of the trough and the amount of the food products being discharged into the receptacle of the weighing system.

The controller is able to change between three operational modes depending on whether the actual weight of the batch collected and received in the receptacle is within the defined target weight.

The first operation mode will be initiated when the actual weight of the batch is reached in respect of the target weight within the target time interval. In the first operational mode, the dosing mechanism is conveying sufficient quantity of food products and the specific target weight of the batch will be reached at the end of the specific time interval.

The second operation mode will be initiated when the actual weight of the batch exceeds the target weight within the target time interval. The controller will decrease the speed of the first conveyor during the second operational mode, as the dosing mechanism has conveyed excessive quantity of food products and the target weight of the batch has been reached before the end of the target time interval.

The third operation mode will be initiated when the actual weight of the batch is below the target weight within the target time interval. In the third operational mode, the dosing mechanism has conveyed insufficient quantity of food products and the specific weight of the batch can only be reached within the specific time interval, when the speed of the first conveyor controlled by the controller is increased during the third operational mode.

In accordance with a method according to a second aspect of the present invention, the invention discloses a method of distributing within a specific time interval a batch of a specific weight of food products onto the top surface of a dough base, such as a pizza base, cake base or the like by means of a food processing system comprising a dosing mechanism, a weighing system, a conveyor system and a controller, the method comprising the following steps:

providing the dosing mechanism having a first conveyor and a trough, the trough including a first inlet end, a first outlet end and a lower part, the first conveyor being positioned in the lower part of the trough, providing the weighing system having a receptacle being positioned below the first outlet end of the trough, providing the conveyor system having a conveyor belt defining a conveying direction and a supporting surface for conveying a number of dough bases being substantially equally spaced on the supporting surface of the conveyor belt, providing a controller connected to the dosing mechanism, the weighing system and the conveyor system, the specific time interval being the time interval between the presence of a first dough base being positioned directly under the receptacle and the presence of a subsequent or second dough base being positioned directly under the receptacle, x. defining a target time interval constituting 40-90 percent of the specific time interval, xi. introducing the food products in bulk into the first inlet end of the trough, xii. conveying the food products from the first inlet end to the first outlet end of the trough for discharging the batch of the food products into the receptacle, xiii. conveying the dough bases in the conveying direction for allowing the dough bases to pass individually under the receptacle, xiv. defining a target weight interval constituting 40-90 percent of the specific weight, xv. determining the actual time interval within which the batch received within the receptacle has reached the target weight, xvi. dependent on the actual time interval, d. determining a first operational mode provided the actual time interval being identical to the target time interval, then continuing operating the first conveyor controlled by the controller at the identical speed, or e. determining a second operational mode provided the actual time interval exceeding the target time interval, then operating the first conveyor controlled by the controller at an increased speed, or f. determining a third operational mode provided the actual time interval being below the target time interval, then operating the first conveyor controlled by the controller at a decreased speed, xvii. transferring the batch of the specific weight being collected in the receptacle on top of the dough bases within the specific time interval, and xviii. repeating the step in points (xi, xii, xiii, xv, xvi, and xvii)

According to the teaching in a second aspect of the invention, the distribution of the food products onto the top surface of the dough base is established by controlling the dosing mechanism based on determining the actual time interval within which the batch received within the receptacle has reached the target time interval. As the controller is connected to the dosing mechanism, the weighing system and the conveyor system, it is possible to distribute a precise quantity of food products on the top surface of the dough base, hereby reducing the amount of spillage in the form of batch having a weight above the specific weight.

The controller provides a method for adjusting the speed of the first conveyor in order to ensure that the specific weight of the batch is reached within the specific time interval during the production of e.g. pizza, cake, base or the like. By adjusting the speed of the first conveyor it is possible to control the amount of food products being conveyed from the first inlet end to the first outlet end of the trough and the amount of the food products being discharged into the receptacle of the weighing system.

The controller in a second aspect of the invention is able to change between three operational modes depending on whether the actual time interval has been reached within the target time interval.

The first operation mode according to the second aspect of the invention will be initiated when the actual time interval is identical to the target time interval. In the first operational mode, the dosing mechanism is conveying sufficient quantity of food products and the specific target weight of the batch will be reached at the end of the specific time interval.

The second operation mode according to the second aspect of the invention will be initiated when the actual time interval exceeds the target time interval. In the second operation mode, the dosing mechanism has conveyed insufficient quantity of food products and the specific weight of the batch can only be reached within the specific time interval when the speed of the first conveyor controlled by the controller is increased during the second operational mode.

The third operation mode according to the second aspect of the invention will be initiated when the actual time interval being below the target time interval. The controller will decrease the speed of the first conveyor in the second operational mode, as the dosing mechanism has conveyed excessive quantity of food products and the target weight of the batch has been reached before the end of the target time interval.

An advantage according to the teaching in a first aspect or a second aspect of the invention is that the distributing of a batch of a specific weight of food products on the top surface of the dough base within a specific time interval provides for reducing the number of products being returned because of insufficient or incorrect weight of food products on the dough base. This is particularly advantageous for automated manufacturing processes in the production of semi-finished products like frozen pizza, bake-off product, etc.

The technique of distributing within a specific time interval a batch of a specific weight of food products on the top surface of the dough base according to the presently preferred method based on determining the actual weight in the receptacle provides the possibility for a batch having a weight in the order of plus/minus 5-10 percent of the specific weight, hereby allowing a smaller deviation in the weight of batch being distributed on the top surface of the dough base.

According to the present invention, the first conveyor would preferably be a screw conveyor positioned in the lower part of the trough for conveying and transporting the food products from the first inlet end to the first outlet end of the trough. The screw conveyor would be operated at rotational speed of 10-200 revolutions per minute and the operational interval is between 100 and 4000 ms. The screw conveyor can either be a shafted screw conveyor or a shaftless screw conveyor. Both types of screw conveyor consist of a spiral (shaftless) or screw (shafted), a conveyor trough, conveyor trough ends, bearings, inlets, discharges and motor for driving the screw. The shaftless screw conveyor is quite similar to a conventional shafted screw conveyor, but the shafted screw conveyor does not come in contact with the inner surface (bottom) of the conveyor trough, whereas the shaftless screw conveyor has a spiral being supported by a liner that is conformed and adapted to the inner circumference of the conveyor trough.

Screw conveyors are advantageous as they are very compact, adaptable to congested locations and they do not have a return similar to drag conveyor. By using screw conveyors, it is possible to handle bulk materials being delivered to the inlet of the trough and transfer the food products from one point (end) to the next.

The screw conveyor is preferably a shaftless screw conveyor, which is suitable for handling and conveying food products having a high moisture content, food products having sticky or wet surface or food products having flexible texture. Still within the scope of the invention, the first conveyor could be a conveyor belt or a drag conveyor belt without transversal protrusion. The conveyor belt would be e.g. a hinged metal belt, hinged plastic belt or a woven wire belt or the like.

According to a further embodiment of the first or second aspect of the present invention, the method provides a vibration mechanism having a tray and being included in the dosing mechanism at the outlet end thereof and defining the first outlet end, vibrating the tray for causing the batch of the food products to be individually separated and for discharging the batch of the food products from the tray to the receptacle. As the food products tend to be sticky and having a high moisture content, the vibration mechanism offers the possibility for separating food products individually from one another and for discharging the batch of the food products from the tray to the receptacle.

The tray forms the vibrational surface of the vibration mechanism according to the present invention and the tray may be vibrated at a frequency of 1-25 Hz, such as 2-20 Hz, e.g. 3-15 Hz, such as 6-12 Hz, further preferably approximately 10 Hz.

The term "batch" should in this context be understood as the precise amount of food products collected in the receptacle, which is to be distributed in the form of smaller pieces on top surface of the dough base within the available specific time interval.

The term "food products" should in this context be understood as specific food or a mixture of different food such a vegetable, fruit, meat or cheese. The vegetable would typically be sliced champions, broccoli etc. The fruit could be annanas, whereas the meat would be ham, poultry, chicken, beef or sausage or the like.

The term "bulk material" should in this context be understood as food product, which is delivered and handled in large quantities before being divided into batch size.

The term "specific time interval" should in this context be understood as a definite length of time representing a period of time between two events or instants and is specified in seconds or milliseconds. In the present invention, the specific time interval defines the time interval between the presence of a first dough base being positioned directly under the receptacle and the presence of a subsequent or second dough base being positioned directly under the receptacle.

The term "specific weight" should in this context be understood as a batch of food products being less than 200 grams, such as less than 100 grams, such as less than 50 grams. The target weight intervals may be found in the range of 10-50 grams.

The term "controller" should in this context be understood as a central unit, computer, programmed logic unit or processing unit that communicates with each of the individual units including the dosing mechanism, the weighing system, the conveyor system, vibration mechanism or guide mechanism by sending and receiving signal. The controller does not need to be a dedicated controller for the food processing system, as the food processing system could also be controlled by a controller used for other equipment or machines using the production line for making the pizza or a similar semi-finished product. The controller is able to communicate by using wire or wireless communication between the units in the food processing system.

According to a further embodiment of the first or second aspect of the present invention, the method comprises the further steps:

xix. lowering the guide toward the dough bases in a fourth operational mode during transferring of the batch in step ix) or xvii), xx. raising the guide to the initial position after depositing the batch on top of the dough bases.

Through the use of a guide, it is possible to deposit the food products in a precise manner, when the batch of food product being collected in the receptacle is released and dropped down onto the top surface of the dough base, hereby the amount of food products, which otherwise would fall onto the conveyor belt being conveyed by the conveyor system, can be reduced to a minimum or even eliminated.

According to a further embodiment of the first or second aspect of the present invention, the method comprises the further step:

xxi. moving the guide in the conveying direction in fifth operational mode during step ix) or xvii).

Through the use of a guide moveable in the conveying direction, it is possible to guide the food products in an even more precise manner when the batch of food product being collected in the receptacle is dropped down onto the top surface of the dough base, hereby the food products, which would normally fall down onto the conveyor belt, will be guided by the guide onto the dough base instead.

According to a further embodiment of the first aspect of the present invention, providing a sensor being positioned upstream of the conveying direction relative to the receptacle for allowing the controller to determine a deviation in the spacing between any two consecutive dough bases, the method further comprises the steps:

xxii. provided the deviation is below a numerical limit such as 0.5% of the spacing, the step a) is performed, or xxiii. provided the deviation is above the numerical lower limit and representing an increased spacing, then step b) is performed, or xxiv. provided the deviation is below the numerical upper limit and representing a decreased spacing, then step c) is performed.

By using a sensor connected to the controller, it is possible to determine the spacing between any two consecutive dough bases and thereby detect a deviation in the spacing between any two consecutive dough bases. The sensor will be positioned upstream of the conveying direction relative to the conveying belt and the receptacle for allowing the controller to detect a deviation in the spacing between two consecutive dough bases. The sensor is positioned upstream of the conveying direction.

According to a further embodiment of the second aspect of the present invention, providing a sensor being positioned relative to the conveying belt for allowing the controller to detect a deviation in the spacing between any two consecutive dough bases, the method further comprises the steps:

xxv. provided the deviation is below a numerical limit and such as 0.5% of the spacing, the step d) is performed, or xxvi. provided the deviation is above the numerical lower limit and representing an increased spacing, then step e) is performed, or xxvii. provided the deviation is below the numerical upper limit and representing a decreased spacing, then step f) is performed.

According to a further embodiment of the first or second aspect of the present invention, the target weight constitutes 45-85 percent of the specific weight of the batch and the target time interval constitutes 45-85 percent of the specific time interval, preferably the target weight constitutes 50-80, 55-75 or 60-70 percent of the specific weight of the batch and the target time interval constitutes 50-80, 55-75 or 60-70 percent of the specific time interval.

According to a further embodiment of the first or second aspect of the present invention, the target weight constitutes 40-50, 50-60, 60-70, 70-80 or 80-90 percent of the specific weight of the batch and the target time interval constitutes 40-50, 50-60, 60-70, 70-80 or 80-90 percent of the specific time interval.

According to a third aspect of the present invention, the food processing system for distributing within a specific time interval a batch of a specific weight of food products onto the top surface of a dough base, such as a pizza base, cake base or the like, comprises a dosing mechanism, a vibration mechanism, a weighing system, a conveyor and a controller:

the dosing mechanism having a first conveyor and a trough, the trough including a first inlet end for receiving the food products in bulk and a first outlet end for discharging a batch of the food products, the first conveyor being positioned in the lower part of the trough for conveying the food products from the first inlet end to the first outlet end of the trough, the weighing system having a receptacle being positioned below the first outlet end of the trough for receiving the batch of food products, a conveyor system having a conveyer belt defining the conveying direction and a supporting surface for conveying a number of dough bases being equally spaced on the conveyer belt in the conveying direction, the controller being connected to the conveyor for controlling the conveying of the dough bases in the conveying direction for allowing the dough bases to pass under the receptacle, the specific time interval being defined as the time interval between the presence of a first dough base being positioned directly under the receptacle and the presence of a subsequent or second dough base being positioned directly under the receptacle, the controller controlling the following process steps:

I. defining a target weight constituting 40-90 percent of the specific weight of the batch, and II. defining a target time interval constituting 40-90 percent of the specific time interval,
III. determining the actual weight of the batch received within the receptacle when the target time interval has passed,
IV. dependent on the actual weight,
   determining a first operational mode provided the actual weight being reached with respect to the target weight within the target time interval, then continuing operating the first conveyor at the identical speed, or
   determining a second operational mode provided the actual weight exceeds the target weight within the target time interval, then operating the first conveyor at an increased speed, or
   determining a third operational mode provided the actual weight being below the target weight within the target time interval, then operating the first conveyor at a decreased speed, and
V. transferring the batch of the specific weight being collected in the receptacle on top of the dough bases within the specific time interval.

According to a third aspect of the present invention, it is possible to distribute quantities of food product on the dough bases in a low cost and extremely precise manner. The food processing system utilizes an advantageous method for providing a simple and an efficient technique for distributing a batch of food products on top of the dough base within a defined specific time interval.

According to a fourth aspect of the present invention, the food processing system for distributing within a specific time interval a batch of a specific weight of food products onto the top surface of a dough base, such as a pizza base, cake base or the like, comprising a dosing mechanism, a vibration mechanism, a weighing system, a conveyor and a controller.

the dosing mechanism having a first conveyor and a trough, the trough including a first inlet end for receiving the food products in bulk and a first outlet end for discharging a batch of the food products, the first conveyor being positioned in the lower part of the trough for conveying the food products from the first inlet end to the first outlet end of the trough, the weighing system having a receptacle being positioned below the first outlet end of the trough for receiving the batch of food products, a conveyor system having a conveyer belt defining the conveying direction and a supporting surface for conveying a number of dough bases being equally spaced on the conveyer belt in the conveying direction, the controller being connected to the conveyor for controlling the conveying of the dough bases in the conveying direction for allowing the dough bases to pass under the receptacle, the specific time interval being defined as the time interval between the presence of a first dough base being positioned directly under the receptacle and the presence of a subsequent or second dough base being positioned directly under the receptacle, the controller controlling the following process steps:
VI. defining a target weight constituting 40-90 percent of the specific weight of the batch, and
VII. defining a target time interval constituting 40-90 percent of the specific time interval,
VIII. determining the actual time interval within which the batch has reached the target weight,
IX. dependent on the actual time interval,
   determining a first operational mode provided the actual time interval being identical to the target time interval, then continuing operating the first conveyor at the identical speed, or
   determining a second operational mode provided the actual time interval exceeding the target time interval, then operating the first conveyor at an increased speed, or
   determining a third operational mode provided the actual time interval being below the target time interval, then operating the first conveyor at a decreased speed, and
X. transferring the batch of the specific weight being collected in the receptacle on top of the dough bases within the specific time interval.

According to a fourth aspect of the present invention, it is possible to distribute quantities of food product on the dough bases in a low cost and extremely precise manner. The food processing system utilizes an advantageous method for providing a simple and an efficient technique for distributing a batch of food products on top of the dough base within a defined specific time interval.

DETAILED DESCRIPTION

The invention will now be explained in more detail by means of examples of embodiments with reference to the schematic drawing. The accompanying drawings illustrate an exemplary non-limiting embodiment.

FIGS. 3A-3G are a series showing the process of colleting a batch of a specific weight and transferring the batch of the specific weight being collected in the receptacle on top of a dough base within a specific time interval in accordance with a first aspect of the present invention.

FIGS. 4A-4F are a series showing the process of colleting a batch of a specific weight and transferring the batch onto the top of a dough base within a specific time interval in accordance with a second aspect of the present invention.

With reference to the accompanying drawings, 10 denotes in its entirety the food processing system for distributing a batch of a specific weight of food products onto the top surface of a dough base according to the present invention.

Figure 1:
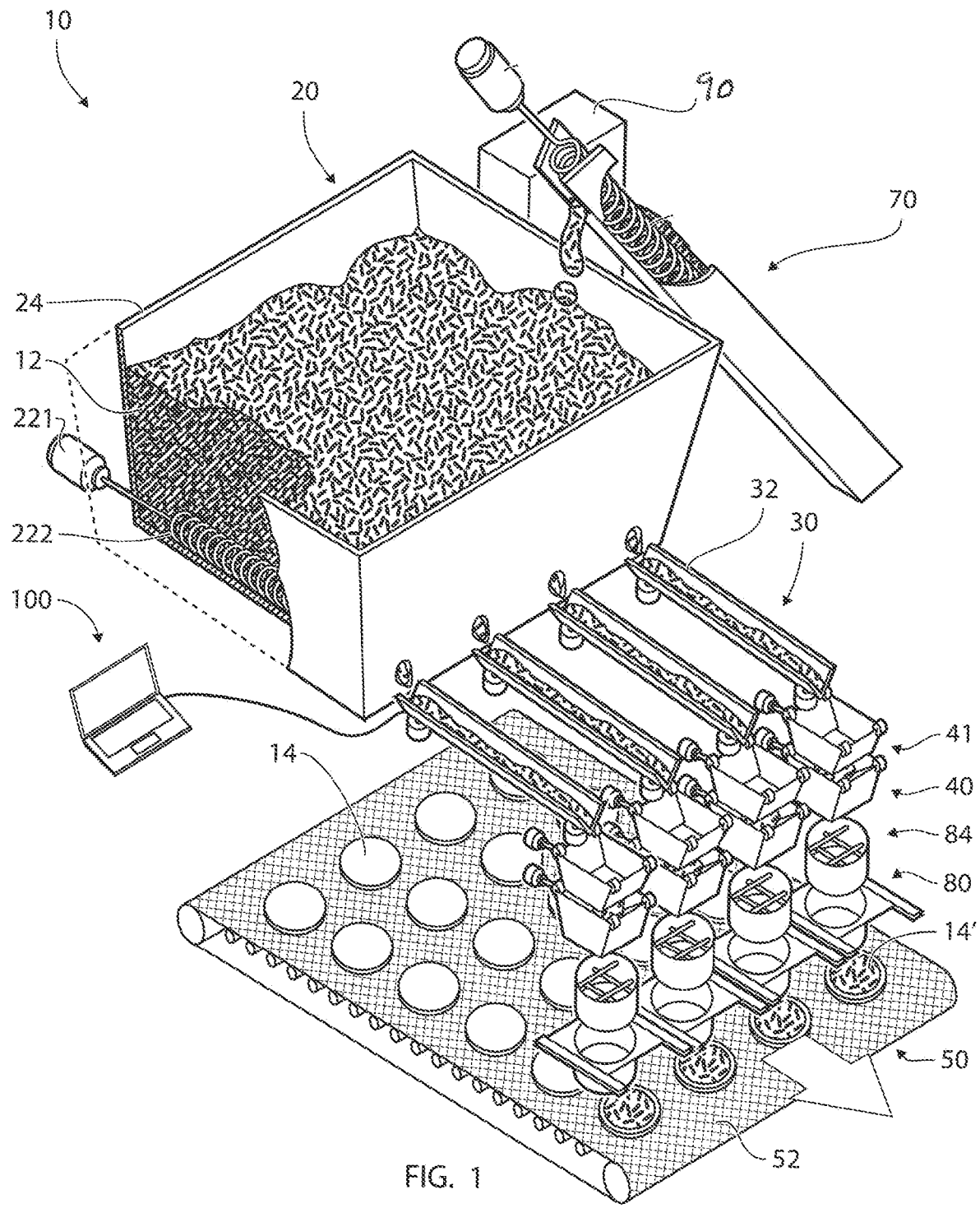
FIG. 1 is a schematic view of the food processing system according to a presently preferred embodiment of the system.

The food processing system 10 shown in FIG. 1 is intended to be used in the production of pizzas, cakes or the like, in particular for the distribution of the food products 12 onto the dough bases 14.

FIG. 1 shows a first and presently preferred embodiment of the food processing system 10 comprising a dosing mechanism 20, a weighing system 40, a conveyor system 50 and a controller 90. The food processing system 10 further comprising an infeeder 70 being connected to the dosing mechanism 20 for feeding bulk of food products 12 into the trough 24. A frame assembly 100 is provided for supporting the dosing mechanism 20, the vibration mechanism 30, the weighing system 40, the controller 90 and the infeeder 70.

The food products are delivered in bulk to the trough 24 and the trough 24 is filled in an initial step prior to the process of distributing the food products onto the top surfaces of the dough base. However, it is possible to fill the trough during the distribution steps in the event that more food product is required in order to continue the operation of the food processing system.

The food processing system 10 comprises an infeeder 70 being connected to the dosing mechanism 20 for feeding food products 12 in bulk into the trough 24. The bulk food product is distributed in the trough 24 by a bulk conveyor 23 driven by an actuator 25. The bulk conveyor 23 for distributing and stirring the food products is not shown in FIG. 2A-2D.

In the present invention, it is possible to use a shafted conveyor or shaftless conveyor for transferring the food products. However, the screw conveyor 22 shown in FIGS. 2A-2E is a shaftless screw conveyor driven by a motor being connected to the controller 60 and the invention would be explained in relation to a shaftless screw conveyor.

FIGS. 2A-2D show a dosing mechanism 20 having a first conveyor such as a screw conveyor 22 and a trough 24 including a first inlet end 26 and a first outlet end 28. The screw conveyor is positioned in the lower part of the trough 24 in the vicinity of the bottom part of the trough 24.

The shaftless screw conveyor 22 has a spiral 222 supported by the inner surface of the trough 24. The weight of the shaftless spiral is distributed over the entire length of the shaftless spiral. The shaftless spiral 222 comprising a connecting interface located in one end for allowing the shaftless spiral 222 to be connected to the screw conveyor motor 221 and the opposite end of the connecting interface of the spiral 22, which is able to rotate freely. The shaftless spiral 222 is positioned parallel with the conveying direction 2 in the lower part of the trough 24.

The shaftless screw conveyor 22 is a volumetric conveying device and each revolution of the screw results in discharging a fixed volume of food products. The screw conveyor would be operated at rotational speed of 10-200 revolution per minute and the operational interval is between 100 and 4000 ms.

Figure 2A:
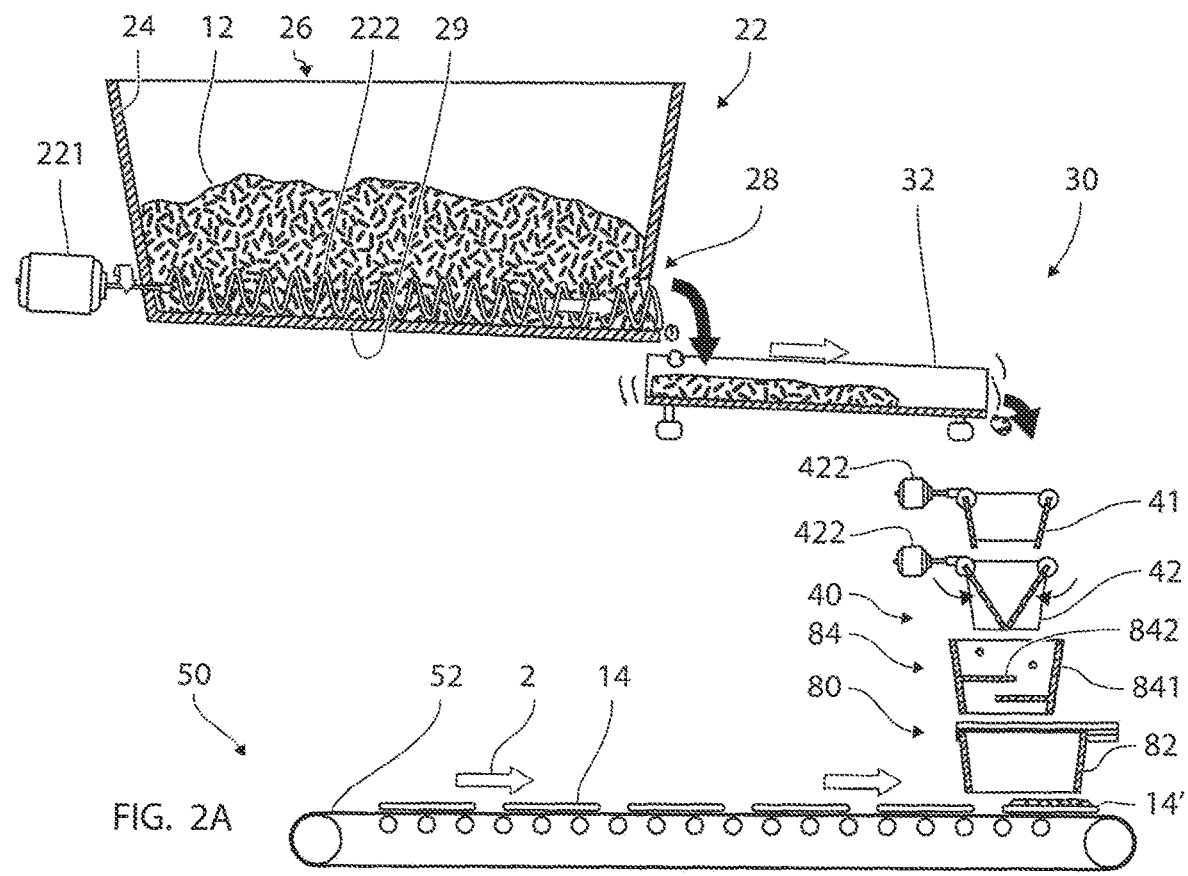
FIGS. 2A-2F are a series showing the food product being conveyed by the dosing mechanism and being deposited onto the top surface of the dough bases.
Figure 2B:
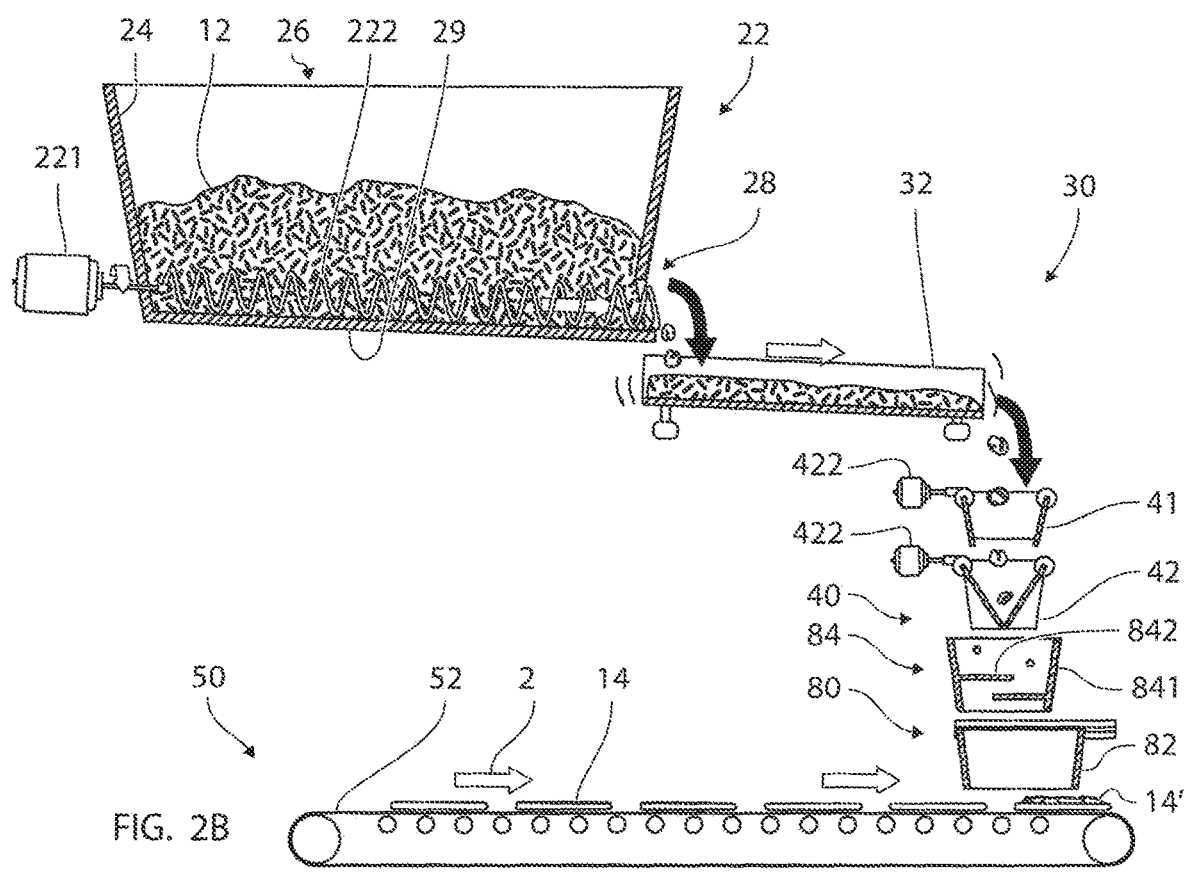
Figure 2C:
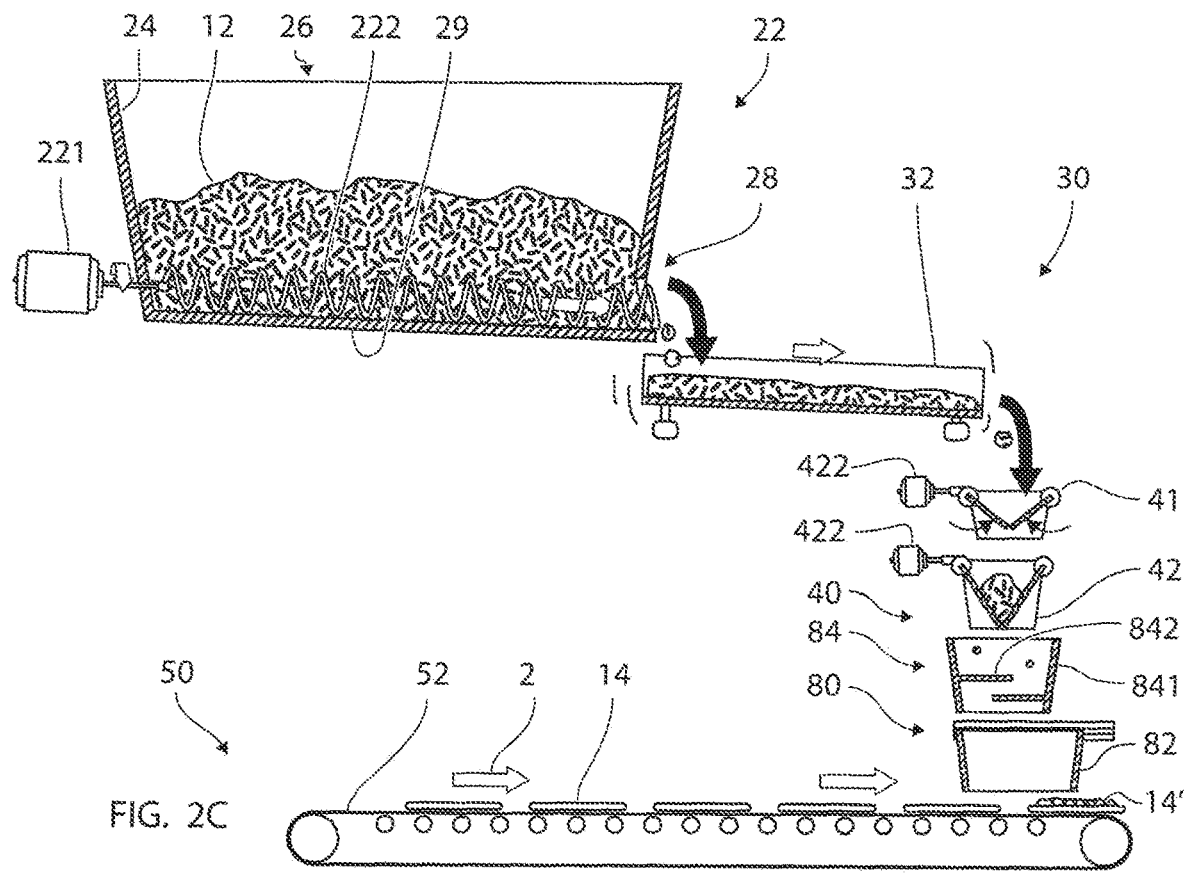

FIGS. 2A-2C show the shaftless screw conveyor 22 in operation and from these figures it is also possible to realize that the shaftless screw conveyor 22 is suitable for conveying sticky bulk of food products because there is no center pipe onto which the sticky bulk food products will adhere.

In FIGS. and 2A-2D, the vibration mechanism 30 is included in the dosing mechanism 20 at the outlet end 28 thereof and defining the first outlet end, the vibration mechanism 30 has a tray 32 connected to a vibration unit (not shown) for causing the food products to be individually separated and for discharging the food products from the tray 32 into the receptacle 42. The tray 32 includes two inclined &de walls that forms a v-shaped tray. The vibration mechanism 30 is controlled by the controller 90 and the vibration mechanism 30 receives an electrical signal dependent on the frequency at which the vibration surface will vibrate and the duration for vibrating the vibration surface. FIGS. 2A-20 show the vibration mechanism 30 in operation.

As the food products tend to be sticky and having a high moisture content, the vibration mechanism 30 offers the possibility of separating the food products 12 individually from one another and of discharging the batch of the food products from the tray to the receptacle 42.

The weighing system 40 comprises a receptacle 42 being positioned perpendicularly to one another in relation to the conveying direction and measuring means in the forms of load sensor connected to the receptacle, where the load sensor is able to send signal to the controller. In FIG. 2A-2E, only one receptacle 42 is shown for the sake of simplicity. The receptacle 42 shown in FIGS. 1 and 2A-2E comprises two separate parts 421 and an actuator 422, where the two separate parts 421 are hinged in a pivotal manner to form a bucket shaped receptacle. The actuator 422 is able to pivot the two separate parts 421 in order to move the parts between an open position shown in FIGS. 2D-2E and closed position as shown in FIG. 2A-2C. The receptacle 42 could also just consist of one movable part being movable between two outer positions.

In FIG. 2A-2E, FIG. 3B-3G, FIG. 4B-4F, a gate 41 is provided between the outlet end 28 of the dosing mechanism 20 and the receptacle 42. The gate 41 can be closed during the operation of the food processing system 10. The gate 41 will be closed during the step of measuring the weight of the food products in the receptacles 42 or when dosing of the food products onto the dough bases is taking place. By blocking the food products to be dropped into the receptacle during the step of measuring the weight of the batch of food products or during the step of depositing the batch of food products, it is possible to avoid excessing to be dropped onto the dough bases.

Figure 2D:
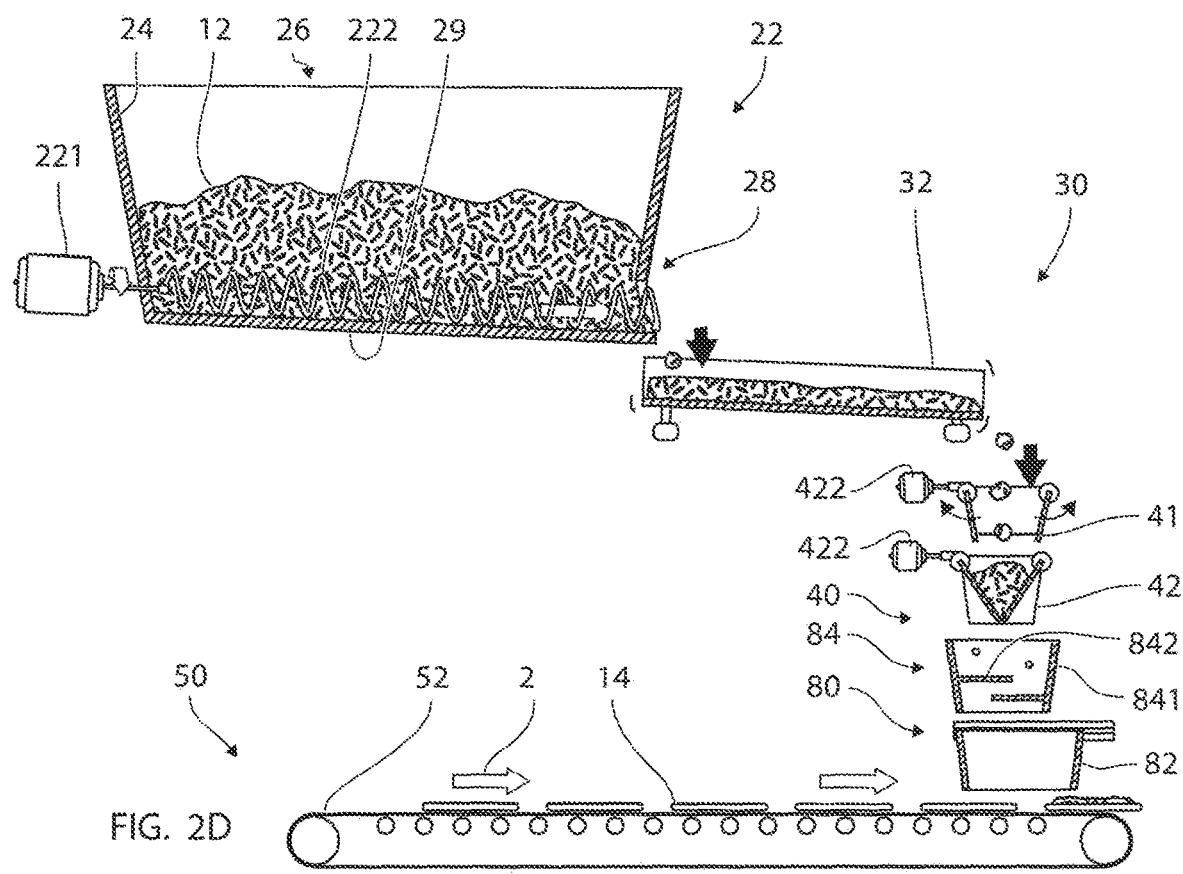
Figure 2E:
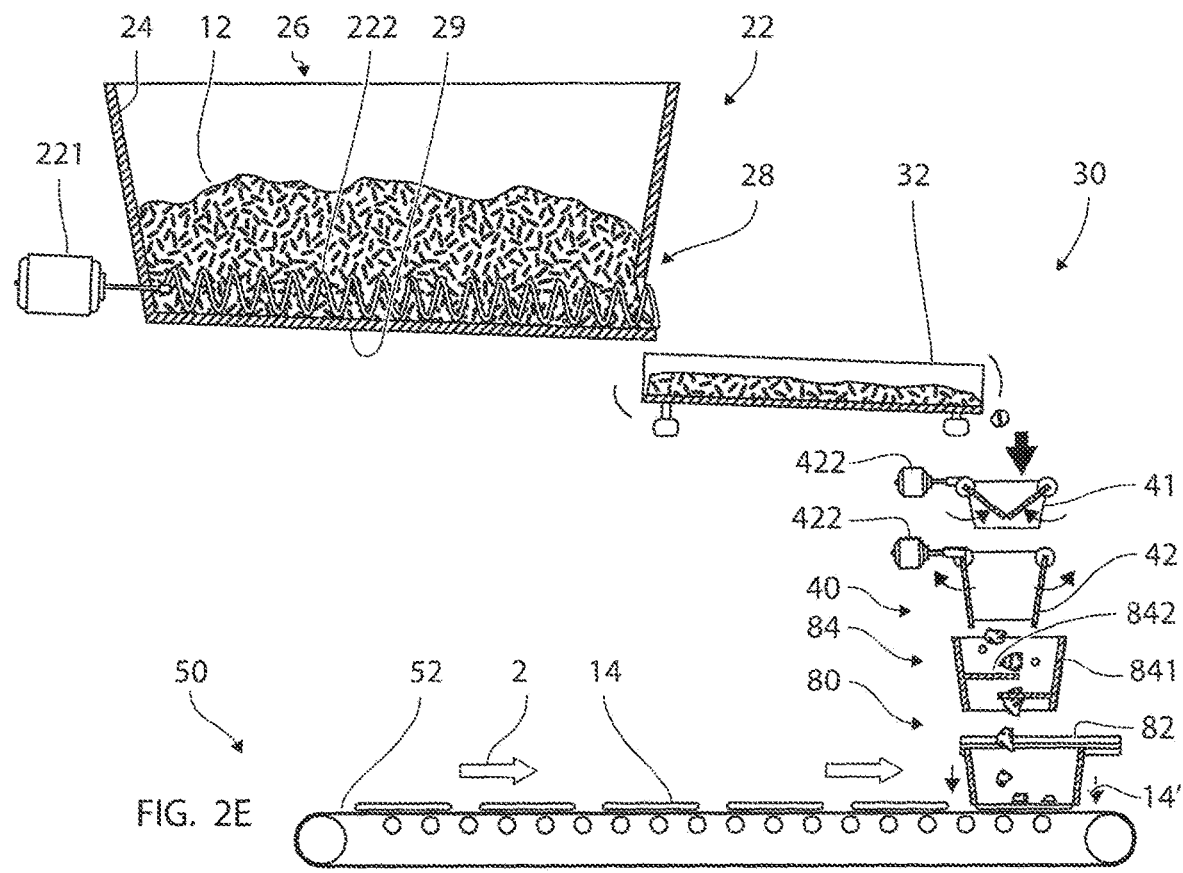
Figure 2F:
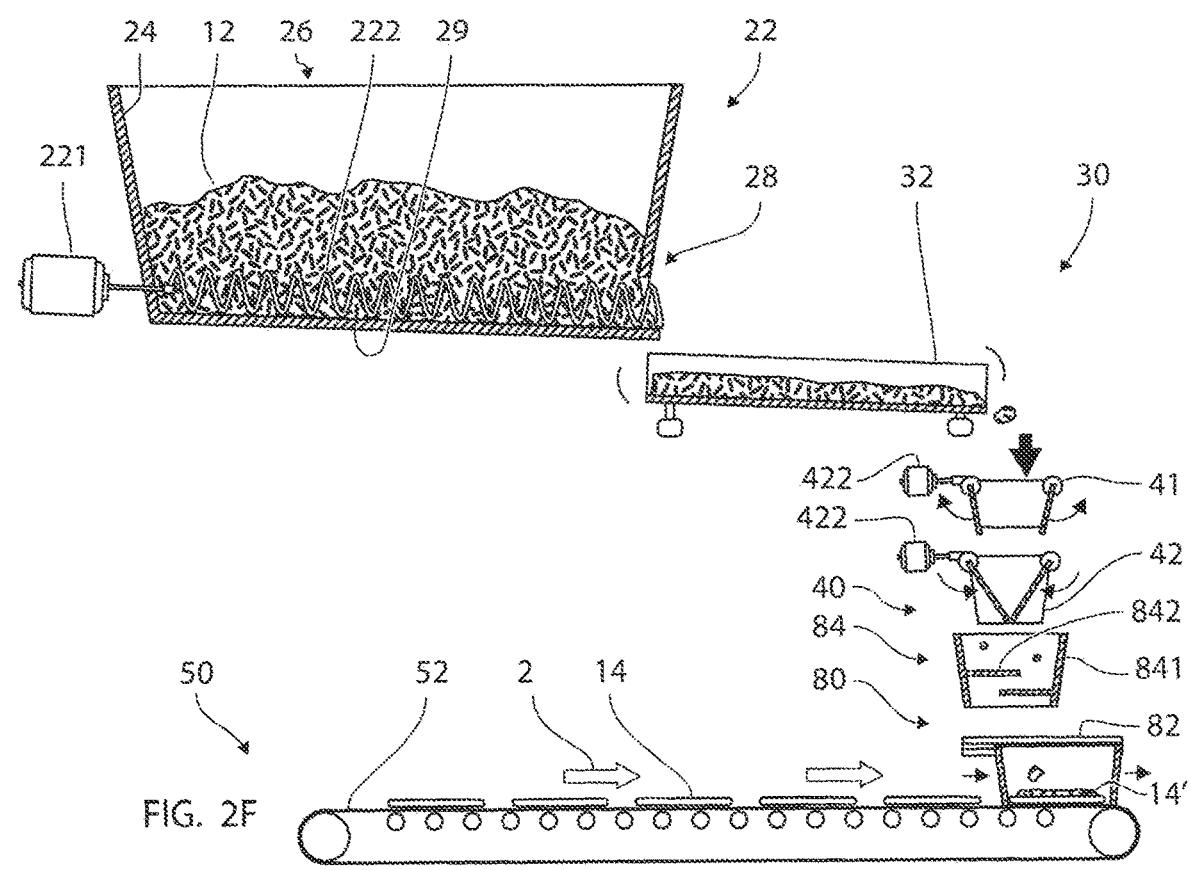

The gate 41 is closed during the measuring step shown in FIG. 2C and during the depositing step shown in the FIG. 2E. The gate 41 will be open in the step shown in FIGS. 2D and 2F.

The weighing system 40 is controlled by the controller 90 that receives an electrical signal from each of the measuring means positioned on or connected to the receptacles 42, representing the weight of the batch/content in the individual receptacle A guide 80 is positioned juxtaposed to the outlet end of the receptacle 42 and being movable in vertical direction relative to the dough base and being movable in the conveying direction during distributing the batch onto the top surface of the dough base 14, 14'.

The guide 80 comprises a ring-shaped element 81 and guiding tracks 82, which are positioned below with the outlet end of the receptacle 42. The guide 80 is connected to the frame assembly 100 or the dosing mechanism 20. The ring-shaped element 81 is supported on the guiding tracks 82 and by using guide actuator 84, it is possible to move the ring-shaped element 81 in vertical direction relative to the dough base in a fourth operational mode and being movable in the conveying direction 2 during a fifth operational mode during distributing the batch onto the dough base. The ring-shaped element 81 is used for guiding the food products when the batch of food product being collected in the receptacle 42 is dropped down onto the top surface of the dough base being conveyed by the conveyor system 50.

A divider 84 is interposed between the outlet end of the receptacle 42 and the guide 80. The divider 84 comprises a cone 841 and a number of rods 842 extending from the inner surface of the cone and the divider is positioned below and coaxial with the outlet end of the receptacle 42.

In FIGS. 1 and 2A-2D, the conveyor system 50 includes a conveyor belt 52, which comprises a flexible material such as polyester material. The conveyor belt 52 is driven by a conveyor belt motor 54, such as an electrically operated motor, and the conveyor belt motor 54 is connected to the controller 90 for allowing the conveyor belt to be operated at constant speed.

FIG. 2A shows the food processing system 10 when food products start to be conveyed from the first inlet end 26 to a first outlet end 28, where the food products are discharged onto the tray 32, where vibration of the tray causes the food products to separate, but no food product has yet been collected in the receptacle 42.

FIG. 2B shows the food processing system 10 when food products collected on the tray start to drop down into the receptacle 42. The food products are simultaneously conveyed from the first inlet end 26 to a first outlet end 28 onto the tray 32, where vibration of the tray causes the food products to separate.

FIG. 2C shows the food processing system 10 when food products have been conveyed and vibrated for some time so that a batch of food products has been collected in the receptacle 42.

FIG. 2D shows the food processing system 10 when the batch of food products are released from the receptacle 42 and dropped down onto the top surface of a dough base. The ring-shaped element 81 supported on the guiding tracks 82 is moved in vertical direction relative to the dough base 14,14'. No food products will be discharged onto the tray 32 or conveyed from the tray 32 into the receptacle 42.

FIG. 2E shows the food processing system 10, when the batch of food products has been released from the receptacle 42 and dropped down onto the top surface of a dough base. The ring-shaped element 81 supported on the guiding tracks 82 is moved in the conveying direction 2 during this operational mode during distributing the batch onto the dough base 14,14'. No food products will be discharged onto the tray 32 or conveyed from the tray 32 into the receptacle 42.

FIGS. 3A-3G is a series showing the colleting a batch of a specific weight and transferring the batch of the specific weight being collected in the receptacle on top of a dough base within a specific time interval in accordance with a first aspect of the present invention. For the sake of simplicity, only the first outlet end of the dosing mechanism is shown; however, it is contemplated that the food processing system comprises a dosing mechanism, a weighing system, a conveyor system and a controller.

FIG. 3A shows the method according to a first aspect of the invention, disclosing a method of distributing within a specific time interval a batch of a specific weight of food products onto the top surface of a dough base, such as a pizza base, cake base or the like FIG. 3B shows the initial step ($T_0$), where the receptacle 42 is closed and a number of dough bases 16,18 being substantially equally spaced on the supporting surface of the conveyor belt is conveyed in the conveying direction 2 for allowing the dough bases to pass individually under the receptacle 42. The food products are introduced in bulk into the first inlet end 26 of the trough (not shown). The gate 41 is open and the food product can be conveyed into the receptacle 42.

FIG. 3C shows the step of conveying the food products ($T_1$), where the receptacle has been closed and food products start being conveyed and being collected in the receptacle positioned below the first outlet end of the dosing mechanism. The food products are conveyed from the first inlet end 26 to the first outlet end 28 of the dosing mechanism 20 for discharging the batch of the food products 12 into the receptacle 42 (not shown). The gate 41 is open and the food products can be conveyed into the receptacle 42.

The specific time interval ($T_0$-$T_{0'}$) is the time interval between the presence of a first dough base 16 being positioned directly under the receptacle and the presence of a subsequent or second dough base 18 being positioned directly under the receptacle 42.

The controller is programmed with information in relation to the operation so that the food processing system can be operated in accordance with a first aspect of the invention. The target weight $W_T$ and the target time interval ($T_T$) are defined and the information is entered into the controller. The target weight $W_T$ constituting 40-90 percent of the specific weight ($W_s$) of the batch and the target time interval ($T_T$) constituting 40-90 percent of the specific time interval ($T_S$).

FIG. 3D shows the step of determining the actual weight $W_a$ of the batch received in the receptacle, when the target time interval $T_T$ has passed and dependent on the actual weight $W_a$ measured, one of the following operational modes is performed by the controller a. determining a first operational mode provided the actual weight being reached with respect to the target weight within the target time interval, then continuing operating the first conveyor controlled by the controller at the identical speed, or b. determining a second operational mode provided the actual weight exceeding the target weight within the target time interval, then operating the first conveyor controlled by the controller at a decreased speed, or c. determining a third operational mode provided the actual weight being below the target weight within the target time interval, then operating the first conveyor controlled by the controller at an increased speed.

According to the teaching in a first aspect of the invention, the distribution of the food products onto the top surface of the dough base is established by controlling the dosing mechanism based on determining the actual weight $W_a$ in the receptacle 42 of the weighing system 40 when the target time interval has passed ($T_T$).

The controller 100 is able to change between three operational modes depending on whether the actual weight ($W_a$) of the batch collected and received in the receptacle is within the defined target weight ($W_T$).

The first operation mode will be initiated when the actual weight of the batch is reached in respect of the target weight within the target time interval ($T_T$). In the first operational mode (a'), the dosing mechanism is conveying sufficient quantity of food products and the specific target weight of the batch will be reached at the end of the specific time interval. In the continuing operating (a'), the controller will operate the first conveyor at the identical speed.

The second operation mode will be initiated when the actual weight of the batch exceeds the target weight within the target time interval ($T_T$). The controller 100 will decrease the speed of the first conveyor during the second operational mode (b'), as the dosing mechanism 20 has conveyed excessive quantity of food products and the target weight ($W_T$) of the batch has been reached before the end of the target time interval ($T_T$).

The third operation mode (c') will be initiated when the actual weight of the batch is below the target weight within the target time interval ($T_T$). In the third operational mode (c'), the dosing mechanism 20 has conveyed insufficient quantity of food products and the specific weight of the batch can only be reached within the specific time interval ($T_S$), when the speed of the first conveyor controlled by the controller 100 is increased during the third operational mode (c').

FIGS. 3E-3F show the step of transferring the batch of the specific weight being collected in the receptacle onto the top of the dough bases within the specific time interval (delivery cycle). This is shown by reference sign ($T_S$). The guide is lowered toward the dough bases in a fourth operational mode and hereafter moved in the conveying direction in a fifth operational mode during transferring of the batch. Through the use of a guide moveable both in the vertical direction and in the conveying direction, it is possible to guide the food products in a precise manner when the batch of food product being collected in the receptacle is released and dropped down onto the top surface of the dough base, hereby the amount of food products, which would otherwise fall onto the conveyor belt being conveyed by the conveyor system, can be reduced to a minimum or even eliminated. The gate 41 is closed and the food products will not enter into the receptacle 42.

FIG. 3G indicates the end of the specific time interval ($T_S$), which is shown by the reference sign ($T_0'$). The method shown in FIG. 3B-3F is repeated for the subsequent dough bases.

FIGS. 4A-4F are a series showing the process of colleting a batch of a specific weight and transferring the batch onto the top of a dough base within a specific time interval in accordance with a second aspect of the present invention. For the sake of simplicity, only the first outlet end of the dosing mechanism is shown; however, it is contemplated that the food processing system comprises a dosing mechanism, a weighing system, a conveyor system and a controller.

FIG. 4B shows the initial step ($T_0$), where the receptacle 42 is closed and a number of dough bases 16,18 being substantially equally spaced on the supporting surface of the conveyor belt is conveyed in the conveying direction 2 for allowing the dough bases to pass individually under the receptacle 42. The food products are introduced in bulk into the first inlet end 26 of the trough (not shown).

FIG. 4C shows the step of conveying the food products ($T_1$), where the gate 41 is open and the receptacle has been closed. The food products start being conveyed and being collected in the receptacle positioned below the first outlet end of the dosing mechanism. The food products are conveyed from the first inlet end 26 to the first outlet end 28 of the dosing mechanism 20 for discharging the batch of the food products 12 into the receptacle 42 (not shown).

FIG. 4C' shows the step of conveying the food products into the gate 41 to avoid food products being conveyed in the receptacle positioned below the gate 41. The food products are conveyed from the first inlet end 26 to the first outlet end 28 of the dosing mechanism 20 for discharging the batch of the food products 12 into the gate 41.

The specific time interval is the time interval between the presence of a first dough base 16 being positioned directly under the receptacle and the presence of a subsequent or second dough base 18 being positioned directly under the receptacle 42.

FIG. 4D shows the step of determining the actual time interval ($T_a$) within which the batch received within the receptacle has reached the target weight($W_T$) and dependent on the actual time interval,
  d. determining a first operational mode provided the actual time interval being identical to the target time interval, then continuing operating the first conveyor controlled by the controller at the identical speed, or
  e. determining a second operational mode provided the actual time interval exceeding the target time interval, then operating the first conveyor controlled by the controller at an increased speed, or
  f. determining a third operational mode provided the actual time interval being below the target time interval, then operating the first conveyor controlled by the controller at a decreased speed.

According to the teaching in a second aspect of the invention, the distribution of the food products onto the top surface of the dough base is established by controlling the dosing mechanism based on determining the actual time interval within which the batch received within the receptacle has reached the target time interval. As the controller is connected to the dosing mechanism, the weighing system and the conveyor system, it is possible to distribute a precise quantity of food products on the top surface of the dough base, hereby reducing the amount of spillage in the form of batch having a weight above the specific weight.

The controller in a second aspect of the invention is able to change between three operational modes depending on whether the actual time interval has been reached within the target time interval.

The first operation mode (e') according to the second aspect of the invention will be initiated when the actual time interval is identical to the target time interval. In the first operational mode, the dosing mechanism is conveying sufficient quantity of food products and the specific target weight of the batch will be reached at the end of the specific time interval.

The second operation mode (f') according to the second aspect of the invention will be initiated when the actual time interval ($T_a$, $T_3$) exceeds the target time interval. In the second operation mode, the dosing mechanism has conveyed insufficient quantity of food products and the specific weight of the batch can only be reached within the specific time interval, when the speed of the first conveyor controlled by the controller is increased during the second operational mode.

The third operation mode (d') according to the second aspect of the invention will be initiated when the actual time interval ($T_a$, $T_2$) is below the target time interval. The controller will decrease the speed of the first conveyor in the second operational mode as the dosing mechanism has conveyed excessive quantity of food products and the target weight of the batch has been reached before the end of the target time interval.

FIGS. 4E-4F show the step of transferring the batch of the specific weight being collected in the receptacle onto the top of the dough bases within the specific time interval (delivery cycle). This is shown by reference sign ($T_5$). The guide is lowered toward the dough bases in a fourth operational mode and hereafter moved in the conveying direction in fifth operational mode during transferring of the batch. Through the use of a guide moveable both in the vertical direction and in the conveying direction, it is possible to guide the food products in a precise manner when the batch of food product being collected in the receptacle is released and dropped down onto the top surface of the dough base, hereby the amount food products, which would otherwise fall onto the conveyor belt being conveyed by the conveyor system, can be reduced to a minimum or even eliminated.

An advantage according to the teaching in a first aspect or second aspect of the invention is that the distributing of a batch of a specific weight of food products on the top surface of the dough base within a specific time interval provides for reducing the number of products being returned because of insufficient or incorrected weight of food products on the dough base. This is particularly advantageous for automated manufacturing processes in the production of semi-finished products like frozen pizza, bake-off product, etc.

In the above description, a presently preferred embodiment of the food processing system for distributing a batch of a specific weight of food products onto the top surface of a dough base, such as a pizza base, etc. is described with reference to specific elements. However, within the scope of the present invention, numerous modifications are readily perceivable by a person skilled in the art and these modifications are all to be construed part of the present invention as defined in the depending claims.

REFERENCE NUMBERS 2 conveying direction
10 food processing system
12 food products
14 top surface of a dough base
16 first dough base
18 second dough base
20 dosing mechanism 20
22 screw conveyor 22
221 screw conveyor motor 221
222 shaftless spiral 222
24 trough
26 first inlet end
28 first outlet end
30 vibration mechanism
32 tray
34 second inlet end
36 second outlet end
40 weighing system
41 gate
42 receptacle
421 separate parts
422 actuator
50 conveyer
52 conveyor belt
54 conveyor belt motor
80 guide
81 ring-shaped element
82 guiding tracks
84 divider
841 cone
842 rods
90 controller

The invention claimed is:

1. A method of distributing, within a specific time interval a batch of a specific weight of food products onto the top surface of a dough base by a food processing system, the method comprising the steps of:
    (a) providing a dosing mechanism having a first conveyor and a trough, the trough including a first inlet end, a first outlet end, and a lower part, the first conveyor being positioned in the lower part of the trough;
    (b) providing a weighing system having a receptacle positioned below the first outlet end of the trough, wherein the specific time interval is the time interval between the presence of a first dough base being positioned under the receptacle and the presence of a subsequent dough base being positioned under the receptacle;
    (c) providing a conveyor system having a conveyor belt defining a conveying direction and a supporting surface for conveying a number of dough bases substantially equally spaced on the supporting surface of the conveyor belt;
    (d) providing a controller operatively connected to the dosing mechanism, the weighing system, and the conveyor system;
    (e) defining a target weight constituting 40-90 percent of the specific weight of the batch;
    (f) introducing the food products in bulk into the first inlet end of the trough;
    (g) conveying the food products from the first inlet end to the first outlet end of the trough for discharging the batch of said food products into the receptacle;
    (h) conveying the dough bases in the conveying direction to pass the dough bases individually under the receptacle;
    (i) defining a target time interval constituting 40-90 percent of the specific time interval;
    (j) determining an actual weight of each batch received within the receptacle when the target time interval has passed;
    (k) dependent on the actual weight:
        (1) wherein, when the actual weight is reached in respect of the target weight within the target time interval, then continuing operating the first conveyor controlled by the controller at an unchanged speed;
        (2) wherein, when the actual weight exceeds the target weight within the target time interval, then operating the first conveyor controlled by the controller at a decreased speed; and
        (3) wherein, when the actual weight is below the target weight within the target time interval, then operating the first conveyor controlled by the controller at an increased speed;
    (l) transferring the batch of the specific weight being collected in the receptacle on top of the dough bases within the specific time interval; and
    (m) repeating steps (f), (g), (h), (k), and (l).

2. The method of distributing a batch of a specific weight of food products according to claim 1, further comprising the steps of:
    providing a vibration mechanism having a tray in the dosing mechanism at the outlet end thereof and defining the first outlet end; and
    vibrating the tray for causing the batch of the food products to be individually separated and for discharging the batch of the food products from the tray to the receptacle.

3. The method of distributing a batch of a specific weight of food products according to claim 1, wherein the food processing system further comprises a guide, the method comprising the further steps of:
    lowering the guide from an initial position toward the dough bases during the transferring of the batch in step (1); and
    raising the guide to the initial position after depositing the batch on top of the dough bases.

4. The method of distributing a batch of a specific weight of food products according to claim 3, the method comprising the further step of moving the guide in the conveying direction during the transferring step (1).

5. The method of distributing a batch of a specific weight of food products according to claim 1, wherein the target weight is 45-85 percent of the specific weight of the batch, and the target time interval is 45-85 percent of the specific time interval.

6. A food processing system for distributing, within a specific time interval, a batch of a specific weight of food products onto the top surface of a dough base, the food processing system comprising a dosing mechanism, a vibration mechanism, a weighing system, a conveyor system, and a controller, wherein:
    the dosing mechanism includes a first conveyor and a trough, the trough including an inlet end configured for receiving the food products in bulk, and an outlet end configured for discharging a batch of the food products, the first conveyor being positioned in a lower part of the trough so as to convey the food products from the inlet end to the outlet end of the trough;

the weighing system including a receptacle positioned below the outlet end of the trough and configured for receiving the batch of food products;

the conveyor system including a conveyer belt defining a conveying direction and a supporting surface configured for conveying a number of dough bases equally spaced on the conveyer belt, in the conveying direction;

the controller is operatively connected to the conveyor system and configured for controlling the conveying of the dough bases in the conveying direction to pass the dough bases under the receptacle;

the specific time interval is defined as the time interval between the presence of a first dough base being positioned under the receptacle and the presence of a subsequent dough base being positioned under said receptacle; and the controller is operable to perform the following process steps:
(i) defining a target weight constituting 40-90 percent of the specific weight of the batch;
(ii) defining a target time interval constituting 40-90 percent of the specific time interval;
(iii) determining an actual weight of the batch received within the receptacle when the target time interval has passed;
(iv) dependent on said actual weight,
  (a) wherein, when the actual weight is reached with respect to the target weight within the target time interval, then continuing operating said first conveyor at an unchanged speed;
  (b) wherein, when the actual weight exceeds the target, weight within the target time interval, then operating said first conveyor at an increased speed; and
  (c) wherein, when the actual weight is below the target weight within the target time interval, then operating the first conveyor at a decreased speed; and
(v) transferring the batch of the specific weight being collected in the receptacle on top of the dough bases within the specific time interval.

7. A food processing system for distributing, within a specific time interval, a batch of a specific weight of food products onto the top surface of a dough base, the food processing system comprising a dosing mechanism, a vibration mechanism, a weighing system, a conveyor system, and a controller, wherein:

the dosing mechanism includes a first conveyor and a trough, the trough including an inlet end configured for receiving the food products in bulk, and an outlet end configured for discharging a batch of the food products, the first conveyor being positioned in a lower part of the trough so as to convey the food products from the inlet end to the outlet end of the trough;

the weighing system includes a receptacle positioned below the outlet end of the trough for receiving the batch of food products;

the conveyor system includes a conveyer belt defining a conveying direction and a supporting surface configured for conveying a number of dough bases equally spaced on the conveyer belt in the conveying direction;

the controller is operatively connected to the conveyor system and configured for controlling the conveying of the dough bases in the conveying direction to pass the dough bases under the receptacle;

the specific time interval is defined as the time interval between the presence of a first dough base being positioned under the receptacle and the presence of a subsequent dough base being positioned under the receptacle; and the controller is configured for controlling the following process steps:
(i) defining a target weight constituting 40-90 percent of the specific weight of the batch;
(ii) defining a target time interval constituting 40-90 percent of the specific time interval;
(iii) determining an actual time interval within which the batch has reached the target weight; and
(iv) dependent on the actual time interval,
  (a) wherein when the actual time interval is identical to the target time interval, then continuing operating the first conveyor at unchanged speed;
  (b) wherein when the actual time interval exceeds the target time interval, then operating the first conveyor at an increased speed; and
  (c) wherein when the actual time interval is below the target time interval, then operating the first conveyor at a decreased speed; and
(v) transferring the batch of the specific weight being collected in the receptacle on top of the dough bases within the specific time interval.

8. The food processing system according to claim 7, further comprising a vibration mechanism included in the dosing mechanism and defining the outlet end of the trough, the vibration mechanism including a tray and configured for causing the batch of the food products to be individually separated, and for discharging the batch of the food products from the tray to the receptacle.

9. A method of distributing, within a specific time interval, a batch of a specific weight of food products onto the top surface of a dough base, by a food processing system, the method comprising the steps of:

(a) providing a dosing mechanism having a first conveyor and a trough, the trough including a first inlet end, a first outlet end, and a lower part, the first conveyor being positioned in the lower part of the trough;

(b) providing a weighing system having a receptacle positioned below the first, outlet end of the trough, wherein the specific time interval is the time interval between the presence of a first dough base being positioned under the receptacle and the presence of a subsequent dough base being positioned directly under said receptacle;

(c) providing a conveyor system having a conveyor belt defining a conveying direction and a supporting surface for conveying a number of dough bases substantially equally spaced on the supporting surface of the conveyor belt;

(d) providing a controller operatively connected to the dosing mechanism, the weighing system, and the conveyor system;

(e) defining a target time interval constituting 40-90 percent of the specific time interval;

(f) introducing the food products in bulk into the first inlet end of the trough;

(g) conveying the food products from the first inlet end to the first outlet end of the trough for discharging the batch of the food products into the receptacle;

(h) conveying the dough bases in the conveying direction to pass the dough bases individually under the receptacle;

(i) defining a target weight interval constituting 40-90 percent of the specific weight;

(j) determining an actual time interval within which the batch received within the receptacle has reached the target weight;

(k) dependent on the actual time interval,
   (1) wherein, when the actual time interval is identical to the target time interval, then continuing operating the first conveyor controlled by the controller at an unchanged speed;
   (2) wherein, when the actual time interval exceeds the target time interval, then operating the first conveyor controlled by the controller at an increased speed; and
   (3) wherein, when the actual time interval is below the target time interval, then operating the first conveyor controlled by the controller at a decreased speed;

(l) transferring the batch of the specific weight being collected in the receptacle on top of the dough bases within the specific time interval; and (m) repeating steps (f), (g), (h), (j), (k), and (l).

10. The method of distributing a batch of a specific weight of food products according to claim 9, further comprising the steps of:

providing a vibration mechanism having a tray in the dosing mechanism at the outlet end thereof and defining the first outlet end; and vibrating the tray for causing the batch of the food products to be individually separated and for discharging the batch of the food products from the tray to the receptacle.

11. The method of distributing a batch of a specific weight of food products according to claim 9, wherein the food processing system further comprises a guide, the method comprising the further steps of:

lowering the guide from an initial position toward the dough bases during the transferring of the hatch in step (1); and raising the guide to the initial position after depositing the batch on top of the dough bases.

12. The method of distributing a batch of a specific weight of food products according to claim 11, the method comprising the further step of moving the guide in the conveying direction during the transferring step (1).

13. The method of distributing a batch of a specific weight of food products according to claim 9, wherein the target weight is 45-85 percent of the specific weight of the batch, and the target time interval is 45-85 percent of the specific time interval.

* * * * *